United States Patent [19]
Swars

[11] Patent Number: 5,287,615
[45] Date of Patent: Feb. 22, 1994

[54] PROCESS FOR JOINING A HOLLOW SHAFT AND ELEMENTS SLID THEREON

[75] Inventor: Helmut Swars, Bergisch Gladbach, Fed. Rep. of Germany

[73] Assignee: Emitech Gesellschaft für Emissionstechnologie mbH, Lohmar, Fed. Rep. of Germany

[21] Appl. No.: 8,055

[22] Filed: Jan. 22, 1993

Related U.S. Application Data

[63] Continuation of Ser. No. 735,170, Jul. 23, 1991, abandoned, which is a continuation of Ser. No. 532,110, May 30, 1990, abandoned, which is a continuation of Ser. No. 278,838, Dec. 2, 1988, abandoned.

[30] Foreign Application Priority Data

Dec. 15, 1987 [DE] Fed. Rep. of Germany ....... 3742480

[51] Int. Cl.$^5$ .................. B23P 19/04; B21D 39/00
[52] U.S. Cl. .................. 29/523; 29/888.08; 29/888.1
[58] Field of Search ...... 29/6.01, 90.01, 517, 29/522.1, 523, 527.1, 527.5, 890.031, 81.02, 888.08, 888.09, 888.1; 51/90; 72/367; 74/567; 204/25

[56] References Cited

U.S. PATENT DOCUMENTS

| | | | |
|---|---|---|---|
| 2,866,212 | 12/1958 | White et al. | 51/90 X |
| 2,892,254 | 6/1959 | Garvin | 29/6 X |
| 3,134,202 | 5/1964 | Hoefler | 51/90 |
| 3,887,776 | 6/1975 | Karbayashi | 204/25 X |
| 4,132,607 | 1/1979 | Painter et al. | 204/25 X |
| 4,448,343 | 5/1984 | Kochka et al. | 29/890.031 X |
| 4,612,695 | 9/1986 | Umeha et al. | 72/367 X |
| 4,660,269 | 4/1987 | Suzuki | 29/523 |
| 4,763,503 | 8/1988 | Hughes et al. | 72/367 X |

FOREIGN PATENT DOCUMENTS

| | | | |
|---|---|---|---|
| 218335 | 12/1983 | Japan | 29/6 |
| 76634 | 5/1984 | Japan | 29/6 |
| 622656 | 9/1978 | U.S.S.R. | 29/6 |
| 2121908 | 1/1984 | United Kingdom | 29/6 |

*Primary Examiner*—Peter Dungba Vo
*Attorney, Agent, or Firm*—Anderson Kill Olick & Oshinsky

[57] ABSTRACT

The invention relates to a process for producing a connection between a hollow shaft and design elements slid on to the shaft and having an aperture which corresponds to the outer diameter of the hollow shaft, especially for producing assembled camshafts, crankshafts or transmission shafts by hydraulically expanding the hollow shaft, a process which results in plastic deformation and permanent elastic pretension in the surface layer of the aperture of the slid-on design elements and in the case of which the compressive force in the connected region between the hollow shaft and the aperture is very much higher during the hydraulic expansion process than the remaining compressive force after completion of the expansion process. As a result, there occurs a material-locking connection between the material of the surface layer of the aperture of the design element and the material of the plastically deformed hollow shaft.

12 Claims, No Drawings

PROCESS FOR JOINING A HOLLOW SHAFT AND ELEMENTS SLID THEREON

This is a continuation application of U.S. Ser. No. 07/735,170, filed Jul. 23, 1991 now abandoned; which in turn is a continuation application of U.S. Ser. No. 07/532,110, filed May 30, 1990 now abandoned; and which in turn is a continuation application of U.S. Ser. No. 07/278,838, filed Dec. 2, 1988 now abandoned.

BACKGROUND OF THE INVENTION

The invention relates to a process for producing a connection between a hollow shaft and design elements slid on to the shaft and having an aperture which corresponds to the outer diameter of the hollow shaft, especially for producing assembled camshafts, crankshafts or transmission shafts by hydraulically expanding the hollow shaft, a process which results in plastic deformation and permanent elastic pretension in the surface layer of the aperture of the slidon design elements, as well as to design elements suitable for this process.

The process of the above type for connecting design elements with hollow shafts has been found to be particularly successful in the field of camshafts. As compared to so-called shrink connections it is advantageous in respect of the transmission of torque as the achievable tension is not restricted by temperature limit values for the materials which must not be exceeded when joints are produced. As compared to soldered connections, the advantage essentially consists in the fact that the process is simplified; in principle it can be carried out under cold conditions and is therefore more cost-effective. Furthermore, the individual components may be manufactured with smaller tolerances.

SUMMARY OF THE INVENTION

It is the object of the present invention to improve the process of the above-mentioned type even further in respect of the torques transferable between the design elements and the hollow shaft, thereby extending the range of application to components such as assembled crankshafts subject to highest loads without having to do without the basic process-related advantages in producing the connection.

The objective of the invention is achieved by providing a process which is characterised in that the hydraulic expansion of the hollow shaft results in a material-locking connection between the material of the surface layer of the aperture of the design element and the material of the plastically deformed hollow shaft.

DESCRIPTION OF THE INVENTION

The process in accordance with the invention ensures that the percentage of surface area which is directly contacted and at which the adhesion effect causing the material-locking connection occurs is increased considerably. In this way, the transferable torque dependent on the product of area fit and friction coefficient is increased considerably ($M_t = \mu_z \times F_r$). Whereas in the case of purely force-locking connections the journal friction coefficients $\mu_z$ were emprirically determined as being in the region of 0.1 to 0.65, the journal friction coefficient $\mu_z$ of connections produced in accordance with the invention increases to values in excess of 1 and may reach up to a multiple of 1. The percentage of mechanical toothing effects between surface irregularities as otherwise utilised in press-fitting connections may be regarded as relatively insignificant because even if the counter faces are machined with the utmost accuracy, only a small percentage of the theoretical surfaces is in direct contact. By increasing the pressure on the faces to be connected up to the point of plastic deformation of the material, as proposed by the invention, the area percentages in contact with each other increase to an optimum value.

With this process, the compressive force during the application of pressure, which is decisive for the remaining friction coefficient, is greater than the compressive force remaining after completion of the expansion process. In principle, the moments achievable with such a pressure connection are greater than those of a shrink connection in the case of which the maximum compressive force is at the same time the remaining compressive force.

In the case of the process in accordance with the invention, in addition to the plastic deformation of the hollow shaft it is also possible to achieve a plastic deformation at least in the surface layer of the aperture of the design elements by applying higher hydraulic pressures. The desired effect depends on metallic particles of both surfaces coming directly into contact with each other.

An optimum connection is achieved by using a high-tensile material for the design elements, with the wall thickness and flow limit of the material determining the range of the plastically deformed aperture layer. The area pressure applied in the course of expansion is substantially greater than the remaining compression which may be limited, for example, by the tube wall thickness or the yield point of the tube. This process is also suitable for sufficiently torionally stiff tubes with a large diameter, but a small wall thickness and thus a limited stiffness against external pressures. In this way it is possible to produce lightweight camshafts and crankshafts with thin-walled tubes. It is also possible to apply the process to aluminium tubes or titanium tubes, for example, which otherwise have too low a modulus of elasticity.

In a first advantageous embodiment of the process according to the invention, the proposed application of pressure results in a plastic deformation of such an extent that any oxide layers inhibiting the connection are destroyed in the course of expansion. It is of course assumed that the surfaces to be connected comprise oxide layers of a slight thickness only, such as they may occur in a normal atmosphere without any particularly unfavourable conditions such as humidity or the effect of acid.

In a second embodiment of the process in accordance with the invention, the surfaces of the parts to be connected are prepared so as to be metallically clean prior to producing the connection, i.e. by applying a machining process or treating the parts in a reducing atmosphere, and the reducing or inert atmosphere is maintained until the connection is produced. The advantage of the type of process described here is that no oxide inclusions or coating inclusions remain in the connecting layer, the result being a connection of an even higher quality whose strength is improved even further as compared to the above-described connection.

According to a third embodiment of the process according to the invention, the aperture of the design element and/or the surface of the hollow tube is provided with a surface layer which is particularly suitable for the said type of connection, with this operation preferably taking place after a pre-treatment for obtaining a clean metallic surface, but it is also possible to do without such a pre-treatment. The metal layer applied for improving the adhesion effect has a thickness of only a few "A". The adhesion effect may be positively affected by the type of material selected. This is the case if both counter faces are the same in respect of their atomic bonding properties, if the materials have a high surface energy and boundary surface energy and in particular, if they consist of cubically surface-centered metals. The metals should have a high melting point and should not be easily influenced by chemical surroundings, such materials being copper, silver, pure iron, austenitic steel, zinc and nickel.

Such surface layers may be applied mechanically, e.g. by being brushed on, with rotating wire brushes being guided through the aperture whose metal is abraded during this process stage and remains on the surface. In an advantageous embodiment, an already existing oxide layer on the surface to be coated may be abraded or partially destroyed. The brushes may also be provided with a percentage of very hard bristles, in order to improve abrasion on the oxide layer. For applying such surfaces with a small thickness it is also possible to use electro-plating or plasma spraying.

A further aspect of the material used for applying a surface layer is its high plastic deformability as compared to the base material of the design element. The subject of the invention therefore also refers to the build-up of such elements whose coating in the aperture has a thickness of only a few Angstrom and is characterised by one or several of the above-mentioned favourable features, both in respect of the corrosion and bonding properties and also the strength properties relative to the base material.

In a fourth embodiment of the process in accordance with the invention, not only the adhesion effect, but also the effect of abrasion, i.e. grooves is utilised in producing the connection. If as a result of the compressive force applied in the course of joining the effective area of contact is increased in size, it is possible for both the adhesion and abrasion effects to be used to ensure adherence. In the process, in order to achieve "micro-machining" or "micro-joining", abrasively acting particles, e.g. mineral, brittle particles are applied to the surfaces to be connected in the finest possible distribution. In a preferred embodiment, the abrasively acting particles are applied jointly with the metallic or chemical coating already proposed for improving the adhesion effect. These particles are of such a nature and applied in such a way that adhesion cannot be adversely affected, the adhesion particles being very fine-grained diamond or corundum dust or similar hard mineral products. It is important that the particles should not have any oxidising effect.

The adhesion effect is increased if the surface coating into which the particles are pressed have a high strength or hardness. If the adhesively acting layer is very thin, the particles may be pressed through this layer into the hard base of the surfaces to be connected.

I claim:

1. A process for producing a connection at ambient temperature between a hollow shaft and design elements, comprising the steps of:
   providing a hollow shaft;
   providing the design elements, each of said design elements having an aperture with a circumferential surface which corresponds to an outer diameter of the hollow shaft;
   sliding the design elements onto the hollow shaft;
   eliminating oxide layers on a surface of the aperture of the design element and an outer surface of the hollow shaft by one of machining said oxide layers, applying a reducing atmosphere to said oxide layers, and applying a reducing bath to said oxide layers; and
   hydraulically expanding the hollow shaft, thereby plastically deforming said hollow shaft and causing permanent elastic pretension in a surface layer of the circumferential surfaces of the apertures of the design elements, said design elements being deformed only elastically, said expanding step including increasing the hydraulic pressure depending on the condition of corresponding surfaces of the apertures of the design elements and on the hollow shaft to such an extent that permanent laminar adhesion forces between the surface layer of the aperture of the design element and the plastically deformed hollow shaft are effected without the use of constraining dies, thereby joining said design elements to said hollow shaft.

2. A process according to claim 1, and, prior to said step of eliminating oxide layers on at least one of the surfaces of the aperture of the design element and the surface of the hollow shaft by surface treatment, further comprising the steps of placing the hollow shaft and design elements in a reducing and inert atmosphere until performing said expanding step.

3. A process according to claim 1, and further comprising a step of, prior to said expending step, applying a surface layer on the surface of the aperture of the design element or on the surface of the hollow shaft, which improves the adhesion forces of the connection.

4. A process according to claim 3, wherein said surface layer applying step includes applying the surface layer by electroplating.

5. A process according to claim 3, wherein said surface layer applying step includes applying a surface layer of a material which does not corrode in a normal atmosphere.

6. A process according to claim 3, wherein said surface layer applying step includes applying a surface layer of a material having atomic bonding properties equivalent to the hollow shaft or the design element.

7. A process according to claim 3, wherein said surface layer applying step includes applying a surface layer of a material having a higher surface energy.

8. A process according to claim 3, wherein said surface layer applying step includes applying a surface layer of a cubically surface-centered metal.

9. A process according to claim 3, wherein said surface layer is applied mechanically.

10. A process according to claim 9, wherein said surface layer applying step includes abrasively brushing on the surface layer.

11. A process according to claim 10, and further comprising a step of mechanically cracking or removing an existing oxide layer simultaneously with said step of brushing on a surface layer.

12. A process according to claim 11, wherein said step of mechanically cracking or removing an existing oxide layer includes removing the existing oxide layer with a rotating brush.

* * * * *